US011468106B2

(12) United States Patent
Ozaki et al.

(10) Patent No.: US 11,468,106 B2
(45) Date of Patent: Oct. 11, 2022

(54) CONVERSATION SYSTEM

(71) Applicant: NTT DOCOMO, INC., Chiyoda-ku (JP)

(72) Inventors: Yuriko Ozaki, Chiyoda-ku (JP); Hiroshi Fujimoto, Chiyoda-ku (JP); Takanori Hashimoto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/966,284

(22) PCT Filed: Dec. 28, 2018

(86) PCT No.: PCT/JP2018/048571
§ 371 (c)(1),
(2) Date: Jul. 30, 2020

(87) PCT Pub. No.: WO2019/159559
PCT Pub. Date: Aug. 22, 2019

(65) Prior Publication Data
US 2020/0372054 A1    Nov. 26, 2020

(30) Foreign Application Priority Data

Feb. 14, 2018    (JP) .............................. JP2018-024051

(51) Int. Cl.
*G06F 16/00*    (2019.01)
*G06F 16/332*   (2019.01)
(Continued)

(52) U.S. Cl.
CPC ...... *G06F 16/3325* (2019.01); *G06F 16/3329* (2019.01); *G06F 16/3334* (2019.01); *G06F 40/289* (2020.01)

(58) Field of Classification Search
CPC ............ G06F 16/3325; G06F 16/3334; G06F 16/3329; G06F 40/289
(Continued)

(56) References Cited

U.S. PATENT DOCUMENTS

2014/0358889 A1* 12/2014 Shmiel ............... G06F 16/3329
                                                          707/710
2015/0324857 A1* 11/2015 Siegel ................ G06Q 30/0269
                                                          705/14.64
(Continued)

FOREIGN PATENT DOCUMENTS

JP    2003-58464 A    2/2003
JP    2015-49578 A    3/2015

OTHER PUBLICATIONS

Wataru Uchida et al.; "Knowledge Q&A: Direct Answers to Natural Questions"; NTT DOCOMO Technical Journal vol. 14 No. 4; 6 pages; 2013.*
(Continued)

*Primary Examiner* — Monica M Pyo
(74) *Attorney, Agent, or Firm* — Oblon, McClelland, Maier & Neustadt, L.L.P.

(57) ABSTRACT

A conversation device includes: an inquiry unit configured to output an inquiry including presentation of a key; an acquisition unit configured to acquire an answer; a key accumulating unit configured to accumulate keys included in the inquiry as accumulation keys in a case in which a positive answer for the inquiry is acquired; a candidate question sentence extracting unit configured to extract candidate question sentences including the accumulation keys by referring to a question sentence storing unit configured to store a question sentence and a set of keys included in the question sentence in association with each other; a key selecting unit configured to select an inquiry key that is caused to be included in a next inquiry output by the inquiry
(Continued)

unit among a plurality of keys included in the candidate question sentences; and an output unit configured to output one question sentence among the candidate question sentences.

8 Claims, 11 Drawing Sheets

(51) Int. Cl.
*G06F 16/33* (2019.01)
*G06F 40/289* (2020.01)

(58) Field of Classification Search
USPC .......................................................... 707/766
See application file for complete search history.

(56) References Cited

U.S. PATENT DOCUMENTS

2015/0348549 A1* 12/2015 Giuli .................. G10L 15/1822
704/235
2016/0055180 A1* 2/2016 Nishihara ............... G06F 16/58
707/711
2017/0187880 A1* 6/2017 Raanani .............. H04M 3/5191

OTHER PUBLICATIONS

International Search Report dated Mar. 19, 2019 in PCT/JP2018/048571 filed Dec. 28, 2018, 2 pages.
Yamauchi et al., "Focusing Answer Candidates with User Interaction in QA System", IEICE Technical Report, Nov. 3, 2008, vol. 108, No. 283, pp. 23-28, 10 total pages.
Japanese Office Action dated Apr. 6, 2021 in Japanese Patent Application No. 2020-500318 (with English translation), 12 pages.
International Preliminary Report on Patentability and Written Opinion dated Aug. 27, 2020 in PCT/JP2018/048571 (English Translation only), 11 pages.

* cited by examiner

Fig.4

| ANSWER ID | QUESTION SENTENCE | KEY | | | | |
|---|---|---|---|---|---|---|
| 1019 | ARRIVAL SOUND AT TIME OF RECEPTION OF MAIL IS DESIRED TO BE SET TO DIFFERENT SONG IN ACCORDANCE WITH PARTNER | MAIL | RECEPTION COMPLETION | ARRIVAL SOUND | PARTNER | DIFFERENTLY |
| 1019 | CHANGE MAIL ARRIVAL SOUND FOR EACH PARTNER FROM WHICH MAIL HAS BEEN RECEIVED | RECEPTION COMPLETION | FOR EACH PARTNER | MAIL ARRIVAL | SOUND | CHANGE |
| 1020 | SENDER AND SENDER NAME OF MAIL ARE DESIRED TO BE DISPLAYED | MAIL | SENDER | SENDER NAME | | |
| 1020 | SENDER OF MAIL IS DESIRED TO BE KNOWN | MAIL | SENDER | | | |
| 1020 | DISPLAY SENDER NAME OF MAIL | MAIL | SENDER NAME | | | |
| 1020 | FROM WHICH SETTING CAN BE PERFORMED SUCH THAT SENDER OF MAIL IS DISPLAYED? | MAIL | SENDER | SETTING | SETTING | |
| 1020 | IN DISPLAYING SENDER OF MAIL | MAIL | SENDER | | | |
| 1022 | SIMULTANEOUSLY TRANSMIT MAIL TO PLURALITY OF PERSONS | MAIL | PLURALITY OF PERSONS | SIMULTANEOUS TRANSMISSION | | |
| 1022 | TRANSMIT MAIL TO ADDRESSES OF ALL PERSONS TOGETHER | MAIL | ADDRESSES OF ALL PERSONS | TRANSMISSION TOGETHER | | |
| 1022 | TEACH METHOD OF SIMULTANEOUS MAIL TRANSMISSION TO ALL PERSONS | SIMULTANEOUS | ALL PERSONS | MAIL TRANSMISSION | | |
| 1022 | MAIL IS DESIRED TO BE SEND TOWARD PLURALITY OF ADDRESS DESTINATIONS | PLURALITY | ADDRESS DESTINATION | TOWARD | MAIL | TRANSMIT |
| 1022 | TO HOW MANY PERSONS MAIL CAN BE TRANSMITTED ONCE? | ONCE | HOW MANY PERSON | PERSON | MAIL | TRANSMIT |
| 1023 | PHOTOGRAPH IS DESIRED TO BE TRANSMITTED THROUGH MAIL | PHOTOGRAPH | MAIL | TRANSMIT | | |
| 1023 | PHOTOGRAPH IS DESIRED TO BE TRANSMITTED THROUGH MAIL | MAIL | PHOTOGRAPH | TRANSMIT | | |
| 1023 | PHOTOGRAPH-ATTACHED MAIL IS DESIRED TO BE TRANSMITTED | PHOTOGRAPH | ATTACHMENT-COMPLETION | MAIL | TRANSMIT | |
| ... | ... | ... | ... | ... | ... | ... |

20

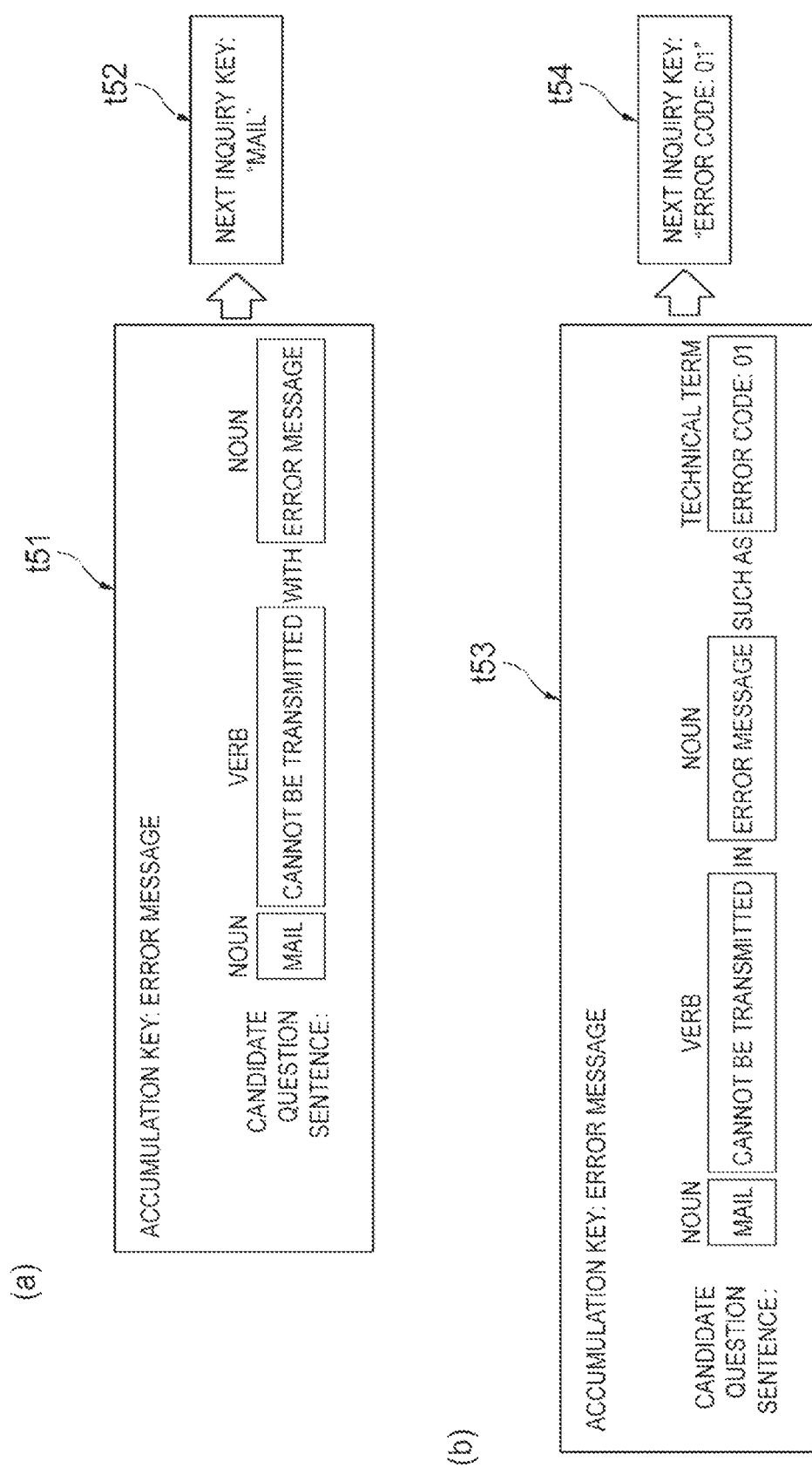

Fig.6 t61

| No. | CANDIDATE QUESTION SENTENCE | KEY |
|---|---|---|
| 1 | MAIL CANNOT BE TRANSMITTED DUE TO ERROR | ERROR |
| 2 | PICTOGRAPH CANNOT BE TRANSMITTED DUE TO ERROR | PICTOGRAPH |
| 3 | PHOTOGRAPH CANNOT BE TRANSMITTED THROUGH MAIL | PHOTOGRAPH |
| 4 | ... | PHOTOGRAPH |
| 5 |  | PICTOGRAPH |
| 6 |  | PHOTOGRAPH |
| ... | ... |  |
| 24 |  |  |

⇧ t62

| INQUIRY KEY | NUMBER OF CANDIDATE QUESTION SENTENCES EXTRACTED USING ANSWER TO INQUIRY KEY |
|---|---|
| ERROR | 1 |
| PICTOGRAPH | 5 |
| PHOTOGRAPH | 10 |

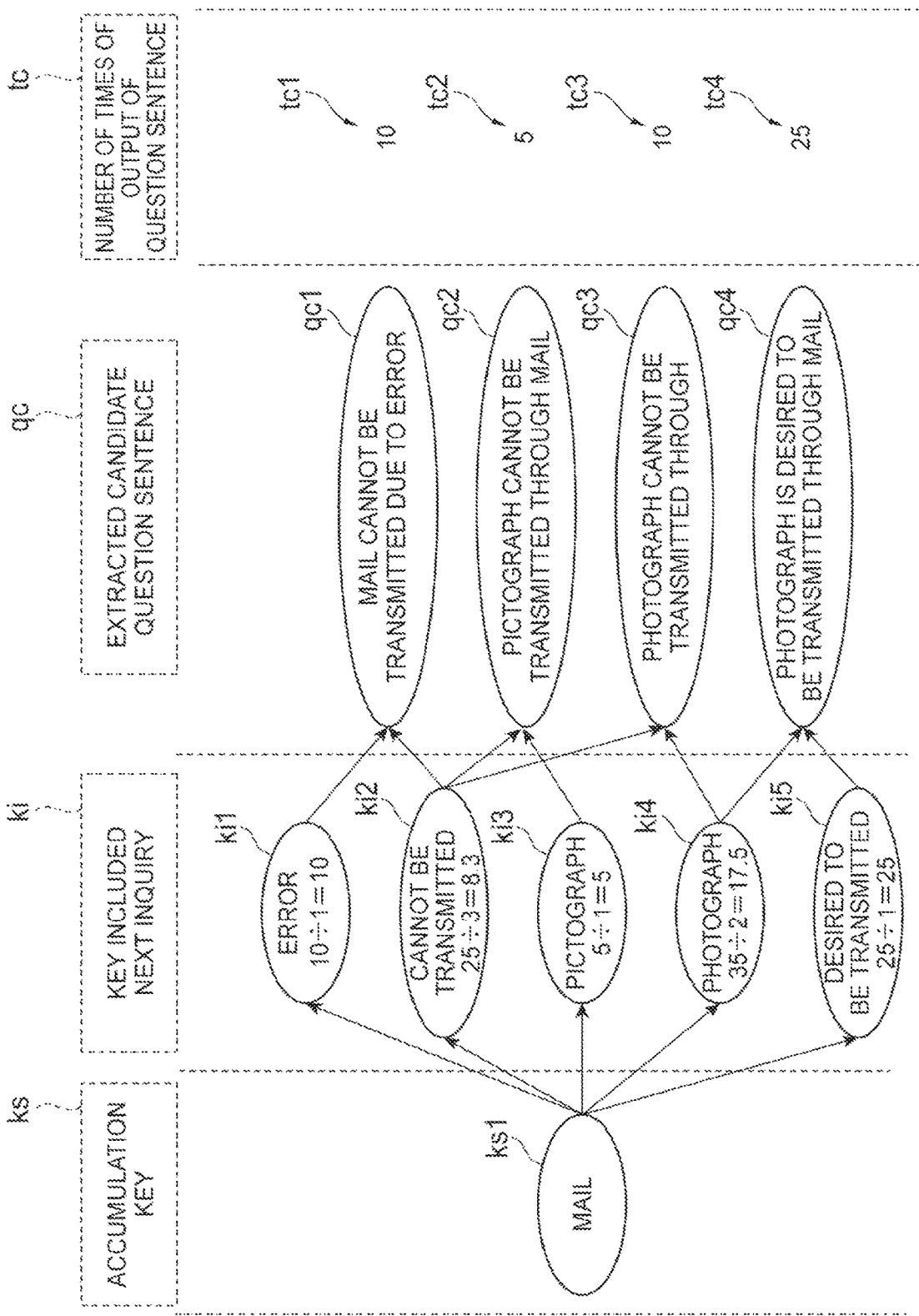

Fig.8

| CANDIDATES FOR INQUIRY KEY | POSITIVE ANSWER | NEGATIVE ANSWER | Skip ANSWER |
|---|---|---|---|
| ERROR MESSAGE | 8 | 19 | 6 |
| PICTOGRAPH | 5 | 18 | 5 |
| CANNOT BE TRANSMITTED | 11 | 13 | 10 |

*Fig.9*

| PREVIOUS INQUIRY KEY | CANDIDATE FOR INQUIRY KEY | POSITIVE ANSWER | NEGATIVE ANSWER | Skip ANSWER |
|---|---|---|---|---|
| MAIL | ERROR MESSAGE | 8 | 19 | 6 |
| MAIL | PICTOGRAPH | 5 | 18 | 5 |
| MAIL | CANNOT BE TRANSMITTED | 11 | 13 | 10 |

CONVERSATION SYSTEM

TECHNICAL FIELD

The present invention relates to a conversation system.

BACKGROUND ART

Conventionally, in a FAQ system, a system that performs an answering process corresponding to a question through matching is known. For example, such a system acquires a search input sentence from a user and presents an answer by matching with an answer sentence that is prepared in advance. In Patent Document 1, it has been described that natural language processing is performed for question details from a user, and, in order to clarify the question details, a process of conversation with the user using an electronic bulletin board, chatting, and the like is performed, and a plurality of questions having high relevancy with a user's question are extracted from a database and are displayed.

CITATION LIST

Patent Literature

[Patent Literature 1] Japanese Unexamined Patent Publication No. 2003-58464

SUMMARY OF INVENTION

Technical Problem

In a FAQ system, there is an interactive-type system in which details of a question from a user are specified on the basis of a positive or negative answer for a keyword presented to the user as an inquiry, and information relating to an answer corresponding to a specified question is provided. This system may be perceived as a search system that specifies details of a question from a user as details of a response on the basis of a keyword. In such a system, by using presentation of a keyword and an answer thereof, question sentence candidates are narrowed down. However, in a conventional interactive-type system, it cannot be determined that the question sentence candidates are appropriately narrowed down to an appropriate number by presenting a keyword once, and there are cases in which a large number of conversations is necessary.

The present invention is in view of the problems described above, and an object thereof is to provide a conversation system capable of decreasing the number of conversations formed from inquiries and answers in an interactive-type system specifying details of a response using an inquiry for a user and a user's answer.

Solution to Problem

In order to solve the problems described above, according to one embodiment of the present invention, there is provided a conversation system configured to specify a response detail specified by a set of one or more keys formed from phrases on the basis of an input from a user, the conversation system including: an inquiry unit configured to output an inquiry including presentation of a key to the user; an acquisition unit configured to acquire an input from the user which includes an answer to the inquiry; a key accumulating unit configured to acquire keys included in the inquiry and accumulates the acquired keys as accumulation keys in a case in which a positive answer indicating positivity for the inquiry is acquired; a candidate response details extracting unit configured to extract the response details including the accumulation keys accumulated by the key accumulating unit as candidate response details by referring to a response details storing unit configured to store the response details and a set of keys included in the response details in association each other; a key selecting unit configured to select an inquiry key that is a key caused to be included in a next inquiry output by the inquiry unit among a plurality of keys included in the candidate response details on the basis of a predetermined technique; and an output unit configured to output one response detail among the candidate response details extracted by the candidate response details extracting unit.

According to the embodiment described above, since a key presented in an inquiry for which a positive answer has been acquired from a user is accumulated as an accumulation key, and a candidate response detail including the accumulation key is extracted, a response detail having a high possibility of corresponding to a response detail according to the user is extracted as a candidate response detail. Then, by selecting an inquiry key from among keys included in the candidate response detail using a predetermined technique, an inquiry through which the number of candidate response details is reliably decreased can be performed. Therefore, the number of conversations for specifying a response detail from the user can be decreased.

Advantageous Effects of Invention

In an interactive-type system specifying details of a response using an inquiry for a user and a user's answer, the number of conversations formed from inquiries and answers can be decreased.

BRIEF DESCRIPTION OF DRAWINGS

FIG. 4 is a diagram illustrating an example of the configuration of a question sentence storing unit and data stored therein.

FIG. 5(*a*) is a diagram illustrating a first example of a process of selecting an inquiry key on the basis of a priority level of an attribute of the key. FIG. 5(*b*) is a diagram illustrating a second example of the process of selecting an inquiry key on the basis of a priority level of an attribute of the key.

FIG. 6 is a diagram illustrating an example of the process of selecting such an inquiry key that the number of candidate question sentences is decreased by a predetermined proportion.

FIG. 7 is a diagram illustrating the process of selecting an inquiry key which reliably contributes to a decrease in the number of candidate question sentences.

FIG. 8 is a diagram illustrating an example of the number of various types of answers for each candidate for an inquiry key extracted from a candidate question sentence.

FIG. 9 is a diagram illustrating an example of the number of various answers for each inquiry key presented in a next inquiry after a certain inquiry key.

DESCRIPTION OF EMBODIMENTS

A conversation system according to an embodiment of the present invention will be described with reference to the drawings. If possible, the same reference signs will be assigned to the same parts, and duplicate description will be omitted.

Figure 1:
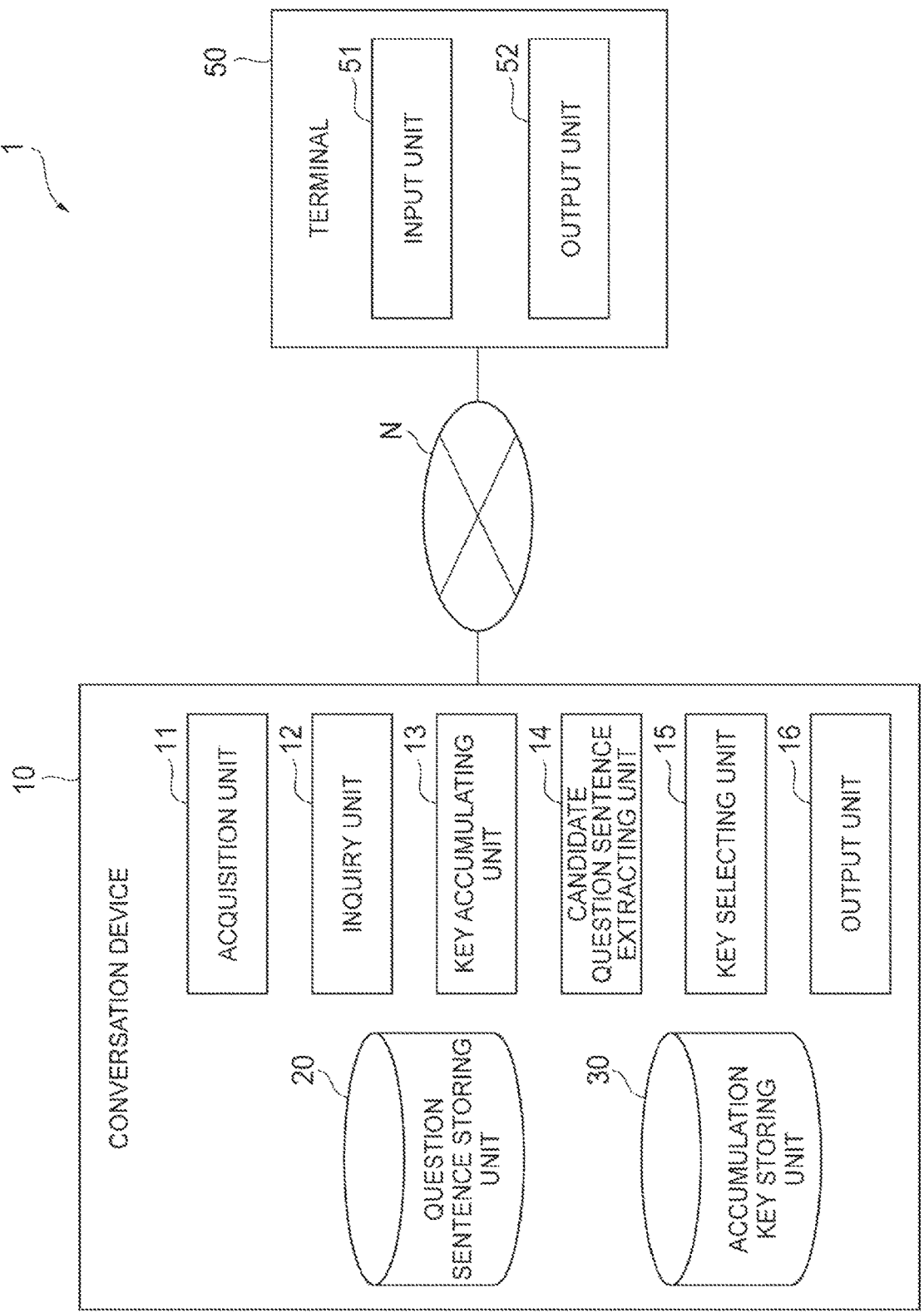
FIG. 1 is a block diagram illustrating the functional configuration of a conversation system according to this embodiment.

FIG. 1 is a block diagram illustrating the functional configuration of a conversation system 1 including a conversation device 10 according to this embodiment. The conversation device 10 is a device that specifies response details specified using a set of one or more keys formed from phrases on the basis of an input from a user. In this embodiment, the conversation system 1 configures an FAQ system that replies to a question from a user with an answer and specifies a question sentence configuring details of the question from the user as response details. In addition, the conversation system 1 may configure a search system that extracts response details on the basis of an input from a user. The input from the user, as will be described below, includes an answer to an inquiry including presentation of a key. As illustrated in FIG. 1, the conversation system 1 includes a conversation device 10 and a terminal 50. Such devices can communicate with each other through a wired or wireless network N.

As illustrated in FIG. 1, the conversation device 10 functionally includes an acquisition unit 11, an inquiry unit 12, a key accumulating unit 13, a candidate question sentence extracting unit 14 (candidate response details extracting unit), a key selecting unit 15, and an output unit 16. In addition, the conversation device 10 includes storage means such as a question sentence storing unit 20 (response details storing unit) and an accumulation key storing unit 30. The terminal 50 includes an input unit 51 and an output unit 52. Such functional units will be described below in detail.

The block diagram illustrated in FIG. 1 represents blocks in functional units. Such functional blocks (constituent units) are realized by an arbitrary combination of hardware and/or software. In addition, a means that realizes each functional block is not particularly limited. In other words, each functional block may be realized by one device that is combined physically and/or logically or may be realized by directly and/or indirectly (for example, in a wired manner and/or a wireless manner) connecting two or more devices that are separated physically and/or logically and using the plurality of devices.

Figure 2:
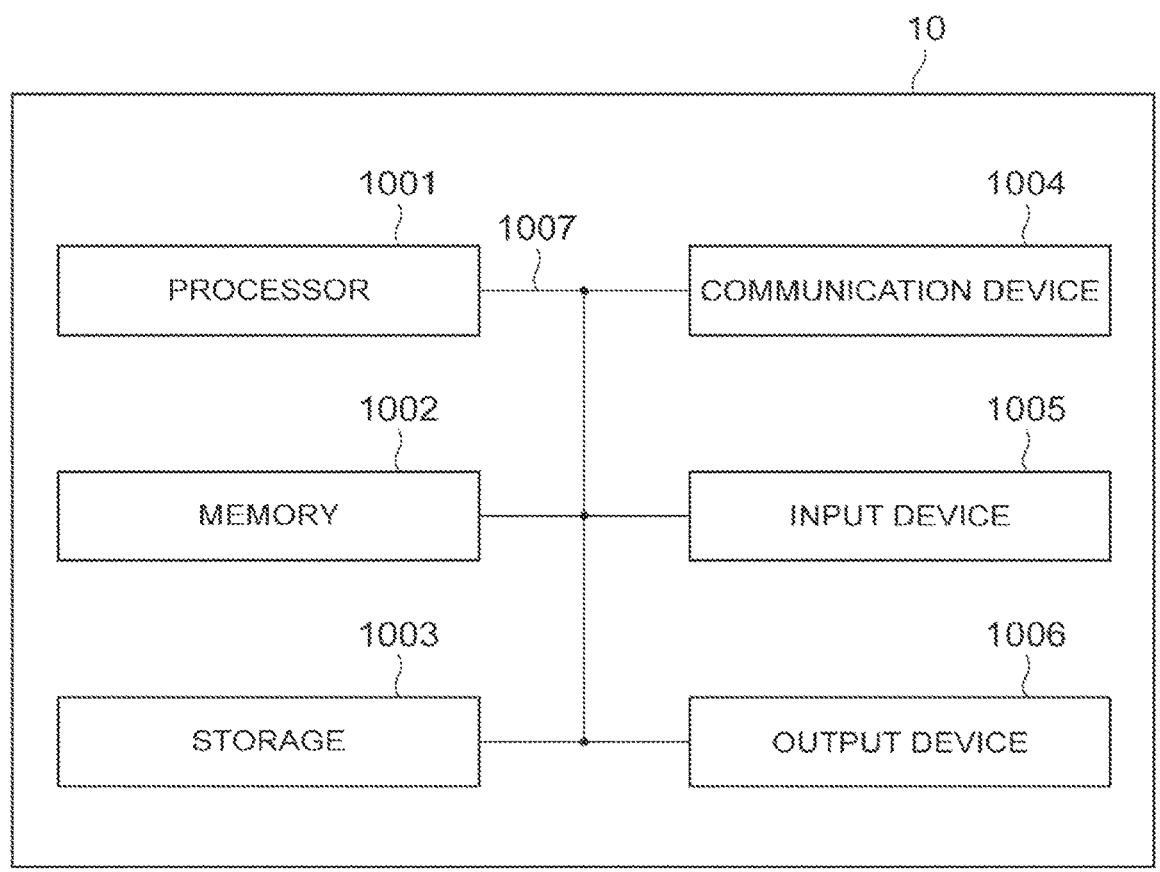
FIG. 2 is a hardware block diagram of a conversation system.

For example, the conversation device 10 according to one embodiment of the present invention may function as a computer. FIG. 2 is a diagram illustrating one example of the hardware configuration of the conversation device 10 according to this embodiment. The conversation device 10 may be physically configured as a computer device including a processor 1001, a memory 1002, a storage 1003, a communication device 1004, an input device 1005, an output device 1006, a bus 1007, and the like.

In addition, in the following description, a term "device" may be rephrased as a circuit, a device, a unit, or the like. The hardware configuration of the conversation device 10 may be configured to include one or a plurality of devices illustrated in FIG. 2 or may be configured not to include some of the devices.

Each function of the conversation device 10 is realized by the processor 1001 performing an arithmetic operation and controlling communication using the communication device 1004 and data reading and/or writing for the memory 1002 and the storage 1003 by causing the processor 1001 to read predetermined software (a program) onto hardware such as the memory 1002 or the like.

The processor 1001, for example, controls the entire computer by operating an operating system. The processor 1001 may be configured by a central processing unit (CPU) including an interface with peripheral devices, a control device, an arithmetic operation device, a register, and the like. In addition, the processor 1001 may be configured to include a graphics processing unit (GPU). For example, functional units 11 to 16 illustrated in FIG. 1 and the like may be realized by the processor 1001.

In addition, the processor 1001 reads a program (program code), a software module, and data from the storage 1003 and/or the communication device 1004 into the memory 1002 and executes various processes in accordance with this. As the program, a program causing the computer to execute at least some of the operations described in the embodiment described above is used. For example, the functional units 11 to 16 of the conversation device 10 may be realized by a control program that is stored in the memory 1002 and is operated by the processor 1001. While various processes described above have been described as being executed by one processor 1001, the processes may be executed by two or more processors 1001 simultaneously or sequentially. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable to perform a conversation method according to one embodiment of the present invention.

The storage 1003 is a computer-readable recording medium and, for example, may be configured by at least one of an optical disc such as a compact disc ROM (CD-ROM), a hard disk drive, a flexible disk, a magneto-optical disc (for example, a compact disc, a digital versatile disc, or a Blue-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including the memory 1002 and/or storage 1003, a server, or any other appropriate medium.

The communication device 1004 is hardware (a transmission/reception device) for performing inter-computer communication through a wired and/or wireless network and, for example, may also be called as a network device, a network controller, a network card, a communication module, or the like.

The input device 1005 is an input device (for example, a keyboard, a mouse, a microphone, a switch, a button, a sensor, or the like) accepting an input from the outside. The output device 1006 is an output device (for example, a display, a speaker, an LED lamp, or the like) performing output to the outside. In addition, the input device 1005 and the output device 1006 may have an integrated configuration (for example, a touch panel).

In addition, devices such as the processor 1001, the memory 1002, and the like are interconnected through a bus 1007 for communication of information. The bus 1007 may be configured as a single bus or may be configured as buses different for devices.

In addition, the conversation device 10 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by hardware. For example, the processor 1001 may be realized using at least one of such hardware components.

In the example illustrated in FIG. 1, although the conversation device 10 is configured as one device, the functional units 11 to 16 may be configured to be distributed to a plurality of devices. In the example illustrated in FIG. 1, although the question sentence storing unit 20 and the accumulation key storing unit 30 are configured in the conversation device 10, the units may be configured in any device using any aspect as long as they are configured to be accessible from the functional units 11 to 16. The terminal 50, similar to the conversation device 10, may be configured as a computer device. The terminal 50 may be configured as a mobile terminal such as a high-functioning mobile phone (smartphone), a mobile phone, or the like.

Figure 3:
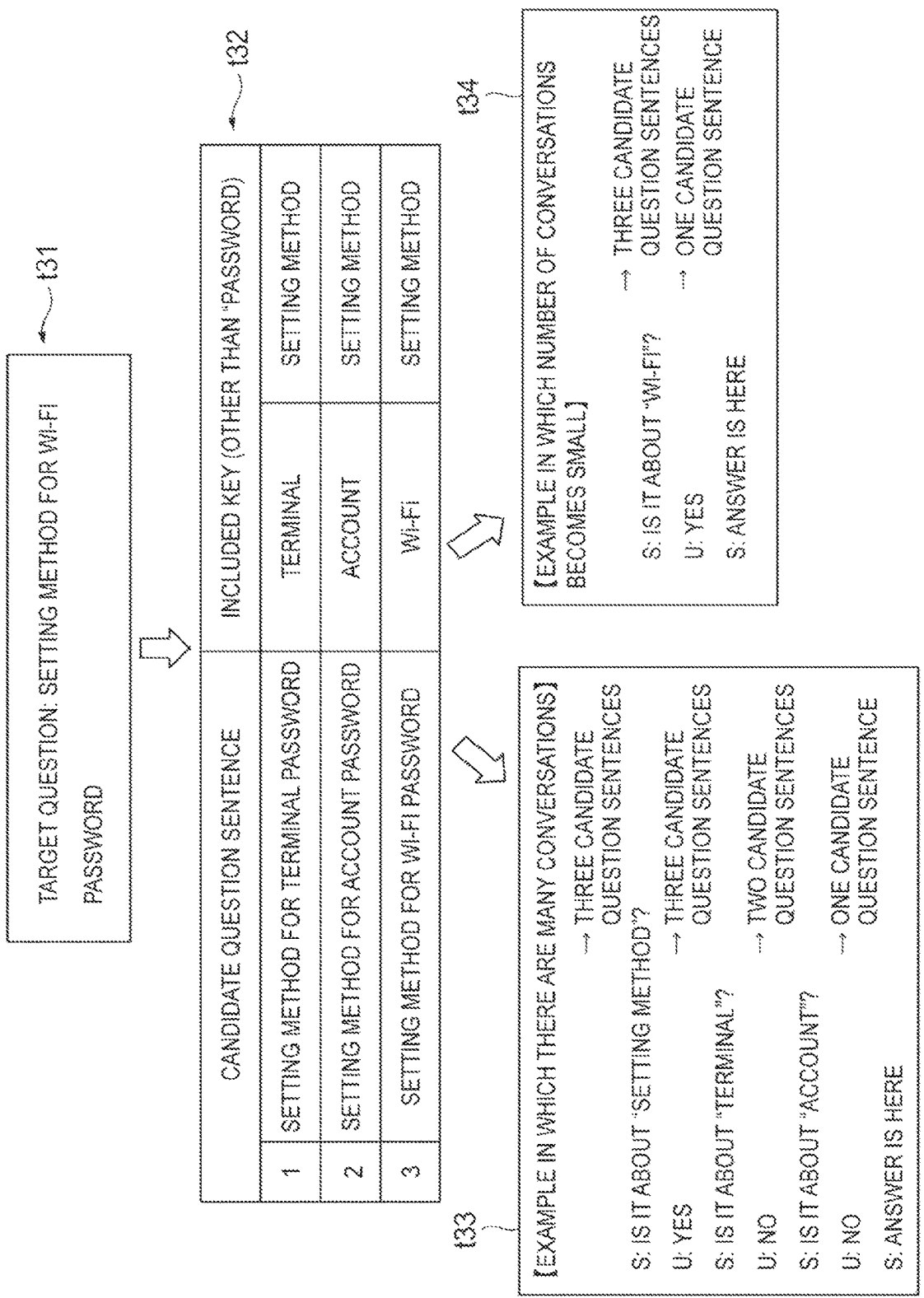
FIG. 3 is a diagram illustrating objects of this embodiment.

FIG. 3 is a diagram illustrating an object of this embodiment. The conversation system 1 according to this embodiment, for example, as will be described with reference to FIG. 3, can configure an FAQ system that outputs an answer for an input of a question from a user.

As denoted by a reference sign t31, in a case in which a user desires to input a question sentence of "a setting method for a password of Wi-Fi" to an FAQ system, a key "password" configuring a part of the question sentence is assumed to be input without inputting the question sentence.

The FAQ system extracts three candidate question sentences including "password" from a database as denoted by a reference sign t32. Each candidate question sentence includes several keys other than "password". For example, a candidate question sentence of "a setting method for a password of a terminal" includes keys such as "terminal" and "setting method" in addition to "password".

The FAQ system narrows down the number of candidate question sentences on the basis of presentation of a key to a user and an answer from the user to the presentation. More specifically, since the FAQ system extracts question sentences that include all the keys relating to positive answers and do not include keys relating to negative answers as candidate question sentences, the number of candidate question sentences is narrowed down when an answer is acquired from a user.

In an example denoted by reference sign t33, the FAQ system, first, transmits an inquiry including presentation of a key "setting method" to a user. For this inquiry, a positive answer "Yes" is input by the user. However, since the key "setting method" is included in all the candidate question sentences, the number of the candidate question sentences does not decrease in accordance with acquisition of this positive answer. Subsequently, the FAQ system transmits an inquiry including presentation of a key "terminal" to the user. When a negative answer "No" for this inquiry is input, the number of candidate question sentences is narrowed down to two. Furthermore, the FAQ system transmits an inquiry including presentation of a key "account" to the user. When a negative answer "No" for this inquiry is input, the number of candidate question sentences is narrowed down to one. Thus, in this example, three conversations are required until candidate question sentences are narrowed down to one.

On the other hand, in an example denoted by reference sign t34, the FAQ system, first, transmits an inquiry including presentation of a key "Wi-Fi" to the user. For this inquiry, when a positive answer "Yes" is input by a user, the number of candidate question sentences including a key "Wi-Fi" among three candidate question sentences is only one, and thus, the number of candidate question sentences is decreased to one. Accordingly, in this example, candidate question sentences are narrowed down to one through one conversation, and, compared to the example of reference sign t33, details of a question from a user are specified through a small number of conversations.

By appropriately selecting a key to be included in an inquiry for presenting to a user, the conversation system 1 according to this embodiment achieves an object of decreasing the number of conversations required for specifying details of a question from the user.

Each functional unit of the conversation device 10 will be described with reference to FIG. 1 again. The acquisition unit 11 acquires an input from a user. In this embodiment, the acquisition unit 11 acquires information that is input by the user and is output by the output unit 52 in the terminal 50. More specifically, the acquisition unit 11 acquires an answer from a user for an inquiry transmitted from the conversation device 10 to the terminal 50. The inquiry will be described in detail below in description of the inquiry unit 12.

In addition, the acquisition unit 11 acquires a free input sentence input by a user. The free input sentence is a sentence composed of arbitrary text and, for example, is an initial question sentence input by a user before output of a first inquiry for the user from the inquiry unit 12. In addition, a question sentence from the user may be input as a free input sentence during a plurality of conversations composed of inquiries and answers.

The inquiry unit 12 outputs an inquiry including presentation of a key to a user. A key is composed of a phrase and is presented to a user for allowing the user to input a positive answer or a negative answer to the phrase. For example, in a case in which an inquiry including presentation of a key "mail" is output, the inquiry unit 12, for example, generates an inquiry sentence such as "Is it for "mail"?" and outputs the generated inquiry sentence to the terminal 50 of the user.

In a case in which a positive answer indicating positivity for an inquiry from the inquiry unit 12 is acquired, the key accumulating unit 13 acquires a key included in the inquiry and accumulates the acquired key as an accumulation key. More specifically, the key accumulating unit 13 stores a key included in an inquiry corresponding to a positive answer in the accumulation key storing unit 30 in association with a type of answer. The accumulation key storing unit 30 is a storage means that stores a key acquired by the key accumulating unit 13.

In a case in which a negative answer indicating negativity for an inquiry or a skip answer is acquired, the key accumulating unit 13 stores a key included in the inquiry corresponding to the answer in the accumulation key storing unit 30 in association with a type of the answer. The skip answer, for example, is an answer not including an intention of any one of positivity and negativity for an inquiry and may have a meaning of suspension of an answer in the case of an inquiry that is difficult for a user to answer.

In addition, the key accumulating unit 13 extracts keys from a free input sentence acquired by the acquisition unit 11 and, similar to a key corresponding to a positive answer, stores the extracted keys in the accumulation key storing unit 30. In this way, by accumulating keys included in a free input sentence, in a case in which question details intended by a user are input as a free input sentence, keys relating to the question details can be acquired.

The candidate question sentence extracting unit 14 extracts question sentences including an accumulation key corresponding to a positive answer accumulated by the key accumulating unit 13 as candidate question sentences by referring to the question sentence storing unit 20. The question sentence storing unit 20 is a storage means that stores a question sentence and a set of keys included in the question sentence in association with each other. In other words, a question sentence can be specified by a set of keys.

FIG. 4 is a diagram illustrating an example of the configuration of the question sentence storing unit 20 and data stored therein. As illustrated in FIG. 4, the question sentence storing unit 20 stores a question sentence and one or more keys included in the question sentence in association with each other. In addition, the question sentence storing unit 20 stores an answer ID used for identifying an answer to a question sentence in association with each question sentence. The answer ID is an identifier used for identifying information relating to an answer to a question sentence, configures information relating to an answer to a question sentence, and, for example, may be an ID of an answer page on which the answer is displayed.

The candidate question sentence extracting unit 14 searches for data of keys in the question sentence storing unit 20 on the basis of an accumulation key corresponding to a positive answer and extracts question sentences including all the accumulation keys. For example, in a case in which keys such as "mail" and "sender name" are accumulated by the key accumulating unit 13, the candidate question sentence extracting unit 14 extracts question sentences "A sender/sender name of a mail is desired to be displayed." and "A sender of a mail is desired to be known".

In addition, the candidate question sentence extracting unit 14 may extract question sentences including an accumulation key corresponding to a positive answer and not including an accumulation key corresponding to a negative answer as candidate question sentences.

The key selecting unit 15 selects an inquiry key output by the inquiry unit 12 among a plurality of keys included in candidate question sentences extracted by the candidate question sentence extracting unit 14. The inquiry key is a key that is caused to be included in a next inquiry output by the inquiry unit 12.

By referring to keys associated with candidate question sentences in the question sentence storing unit 20, the key selecting unit 15 can extract candidates for an inquiry key. The candidates for an inquiry key are keys acquired by excluding keys (keys accumulated by the key accumulating unit 13) that have already been presented in the inquiry from among keys associated with candidate question sentences in the question sentence storing unit 20.

The key selecting unit 15 selects such an inquiry key that the number of candidate question sentences extracted by the candidate question sentence extracting unit 14 is decreased in accordance with a next inquiry and an answer to the inquiry. The key selecting unit 15 may randomly select an inquiry key among the candidates for the inquiry key, and various inquiry key selecting processes that are more effective will be described below.

The key selecting unit 15 may select an inquiry key on the basis of a priority level of an attribute associated with a key. For example, the question sentence storing unit 20 may store various attributes in association with each key associated with a question sentence. The attributes, for example, are a type of a part of speech of a key, the key being a technical term, and the like.

FIGS. 5(*a*) and 5(*b*) are diagrams illustrating a first example and a second example illustrating a process of selecting an inquiry key on the basis of a priority level of an attribute of the key. The first example is a case in which a question sentence "A mail cannot be sent in an error message." is extracted as a candidate question sentence in a case in which a key "error message" is accumulated as an accumulation key corresponding to a positive answer as denoted by a reference sign t51.

This candidate question sentence includes keys "mail" and "cannot be sent" in addition to "error message", and thus candidates for an inquiry key are "mail" and "cannot be sent". A "noun" representing a part of speech is associated with the key "mail" as an attribute. In addition, "verb" representing a part of speech is associated with the key "cannot be sent" as an attribute.

Here, as a priority level of an attribute, a higher priority level is assumed to be set to a noun in advance. In such a case, as denoted by reference sign t52, the key selecting unit 15 selects "mail" associated with a verb as an attribute as an inquiry key.

The second example is a case in which a question sentence "A mail cannot be sent with an error message of "error code: 01" is extracted as a candidate question sentence in a case in which a key "error message" is accumulated as an accumulation key corresponding to a positive answer as denoted by reference sign t53.

This candidate question sentence includes keys "error code: 01", "mail", and "cannot be sent" in addition to "error message" and thus, candidates for an inquiry key are "error code: 01", "mail", and "cannot be sent". Among such candidates, "technical term" is associated with the key "error code: 01" as an attribute.

Here, as a priority level of an attribute, a high priority level is assumed to be set to a technical term in advance. In such a case, the key selecting unit 15, as denoted by reference sign t54, selects "error code: 01" associated with a technical term as an attribute as an inquiry key.

In this way, by setting a priority level in advance to an attribute associated with a key and selecting an inquiry key on the basis of a priority level of an attribute associated with each candidate for an inquiry key, a key that a user can easily answer and has a high possibility of appropriately narrowing down candidate question sentences can be set as an inquiry key.

The key selecting unit 15 may select an inquiry key on the basis of a predetermined dependency relation of a candidate question sentence, in which the accumulation key is included, with the accumulation key.

For example, in a case in which a key "password" (noun) is accumulated as an accumulation key corresponding to a positive answer, when a question sentence "A password of Wi-Fi is not known." is extracted as a candidate question sentence, the key selecting unit 15 acquires "Wi-Fi" (noun) and "is not known" (verb) as candidates for an inquiry key.

Here, the accumulation key "password" that becomes the basis of the extraction of the candidate question sentence is a noun, and a high priority level is assumed to be set to a noun having a dependency relation with an accumulation key that is a noun. In this case, the key selecting unit 15 selects "Wi-Fi" that is a noun having a dependency relation with "password" as an inquiry key.

In addition, in a case in which the key "is not known" (verb) is accumulated as an accumulation key corresponding to a positive answer, when a question sentence "Is the password of Wi-Fi unknown?" is extracted as a candidate question sentence, the key selecting unit 15 acquires "Wi-Fi" (noun) and "password" (noun) as candidates for an inquiry key.

In this case, the accumulation key "is not known" that becomes the basis of the extraction of the candidate question sentence is a verb, and, in a case in which a high priority level is set to a noun having a dependency relation with an accumulation key that is a verb, the key selecting unit 15 selects "password" that is a noun having a dependency relation with "is not known" as an inquiry key.

According to the selection of such an inquiry key, considering that a key having a predetermined dependency relation with an accumulation key in a candidate question sentence has a high possibility of contributing to specifying a question sentence, by selecting a key having the predetermined dependency relation with an accumulation key as an inquiry key, an answer that is effective for narrowing down candidate question sentences can be easily acquired.

In a case in which each question sentence stored in the question sentence storing unit 20 has a priority level set in advance, the key selecting unit 15 may select a key included in a candidate question sentence having a highest priority level among candidate question sentences as an inquiry key.

More specifically, the key selecting unit 15 extracts a candidate question sentence having a highest priority level among a plurality of candidate question sentences extracted by the candidate question sentence extracting unit 14 on the basis of a certain accumulation key. The key selecting unit 15 extracts keys included in the candidate question sentence extracted on the basis of the priority level as candidates for an inquiry key and selects one key as the inquiry key among the candidates for the inquiry key using a predetermined technique described above or to be described below.

According to the selection of such an inquiry key, for example, by associating each question sentence with a priority level in advance on the basis of a frequency at which the question sentence is specified as a question sentence from a user, other ranking information, and the like, a key included in a candidate question sentence having a higher priority level can be selected as an inquiry key. According to an inquiry including the inquiry key selected in this way, the possibility of being able to specify a question sentence from the user can be raised. As a result, the number of conversations used for specifying a question sentence from a user can be decreased.

The key selecting unit 15 may be configured such that it selects an inquiry key reliably contributing to a decrease in the number of candidate question sentences among a plurality of keys included in each of a plurality of candidate question sentences extracted by the candidate question sentence extracting unit 14. More specifically, an inquiry key selected here is a key for which, in a case in which the key is caused to be included in a next inquiry, the number of candidate question sentences extracted by the candidate question sentence extracting unit 14 on the basis of an answer to the next inquiry is decreased by a predetermined proportion for the number of the plurality of extracted candidate question sentences.

FIG. 6 is a diagram illustrating an example of the process of selecting such an inquiry key that the number of candidate question sentences is decreased by a predetermined proportion. As denoted by a reference sign t61, in a case in which 24 candidate question sentences are extracted by the candidate question sentence extracting unit 14, the key selecting unit 15 acquires keys "error", "pictograph", "photograph", and the like included in each of the extracted candidate question sentences as candidates for an inquiry key.

In a case in which each of candidates for an inquiry key is caused to be included in a next inquiry, the key selecting unit 15 calculates the number of candidate question sentences extracted by the candidate question sentence extracting unit 14 on the basis of a positive answer to such a next inquiry as denoted by reference sign t62. In other words, in a case in which "error" is caused to be included in a next inquiry, and a positive answer is acquired, the number of candidate question sentences is decreased from 24 to 1. In addition, in a case in which "pictograph" is caused to be included in a next inquiry, and a positive answer is acquired, the number of candidate question sentences is decreased from 24 to 5. Furthermore, in a case in which "photograph" is caused to be included in a next inquiry, and a positive answer is acquired, the number of candidate question sentences is decreased from 24 to 10.

In a case in which "error" is caused to be included in a next inquiry, and a negative answer is acquired, the number of candidate question sentences is decreased from 24 to 23. In addition, in a case in which "pictograph" is caused to be included in a next inquiry, and a negative answer is acquired, the number of candidate question sentences is decreased from 24 to 19. Furthermore, in a case in which "photograph" is caused to be included in a next inquiry, and a negative answer is acquired, the number of candidate question sentences is decreased from 24 to 14.

For example, when a decrease in the number of candidate question sentences to 40 to 60% based on an answer to a next inquiry is set in advance as a condition for selecting an inquiry key, the key selecting unit 15 selects the key "photograph" that decreases the number of candidate question sentences from 24 to 10 or 14 as an inquiry key.

An inquiry key that extremely decreases the number of candidate question sentences in accordance with a positive answer to a next inquiry hardly decreases the number of candidate question sentences in a case in which the answer to the next inquiry is a negative answer and thus is not preferable. Accordingly, the condition set here may be a condition that the number of candidate question sentences becomes a half in accordance with an answer to the next inquiry.

According to the selection of such an inquiry key, the number of candidate question sentences can be reliably decreased in accordance with each conversation. Therefore, it can be prevented that the number of conversations is extremely increased in accordance with a success/failure of selection of an appropriate inquiry key.

In order to select an inquiry key that reliably contributes to a decrease in the number of candidate question sentences, the key selecting unit 15 may select a key of which a value acquired by dividing a sum of frequency information associated with each candidate question sentence extracted by the candidate question sentence extracting unit 14 on the basis of an answer to a next inquiry by the number of extracted candidate question sentences in a case in which the inquiry key caused to be included in the next inquiry is the largest as an inquiry key.

FIG. 7 is a diagram illustrating the process of selecting an inquiry key which reliably contributes to a decrease in the number of candidate question sentences. In this embodiment, the key selecting unit 15 selects a key of which a value acquired by dividing a sum of the number of times of output of each candidate question sentence extracted by the candidate question sentence extracting unit 14, which is output by the output unit 16, on the basis of an answer to a next inquiry by the number of extracted candidate question sentences in a case in which the key is included in the next inquiry is the largest as an inquiry key.

In the example illustrated in FIG. 7, a relation between an accumulation key ks, a key ki caused to be included in a next inquiry, and an extracted candidate question sentence qc is represented by nodes, and the number of times output by the output unit 16 is associated by specifying each candidate question sentence qc as a question sentence representing details of a question from a user.

For example, in a case in which candidate question sentences qc1 to qc4 are extracted by the candidate question sentence extracting unit 14 on the basis of an accumulation key ks1 "mail", in a case in which a next inquiry is output with a key ki1 "error" included, and a positive answer is acquired, a candidate question sentence qc1 is extracted by the candidate question sentence extracting unit 14. Similarly, in a case in which a next inquiry is output with a key ki2 "cannot be sent" included, and a positive answer is acquired, candidate question sentences qc1 to qc3 are extracted by the candidate question sentence extracting unit 14.

Under such a premise, the key selecting unit 15 calculates a value calculated by dividing a sum of the number of times of output of each candidate question sentence, which is output by the output unit 16, extracted on the basis of a positive answer to a next inquiry by the number of extracted candidate question sentences in a case in which each of the keys ki1 to ki5 is caused to be included in the next inquiry for each of the keys ki1 to ki5. For example, in a case in which a key ki2 "cannot be sent" is caused to be included in the next inquiry, the calculated value becomes 8.3 (=(a sum of the numbers of times tc1, tc2, and tc3)/(the number of extracted candidate question sentences qc1, qc2, and qc3)= (10+5+10)/3). In a case in which a key ki5 "desires to transmit" is caused to be included in the next inquiry, the calculated value becomes 25 (=(the number of times tc4)/ (the number of extracted candidate question sentences qc4) =(25/1)). In the example illustrated in FIG. 7, the key selecting unit 15 selects the key ki5 "desires to transmit" for which the value calculated in this way is the largest as an inquiry key.

According to the selection of such an inquiry key, a question sentence having a high frequency of being specified as a question sentence by a user can be specified through a smaller number of conversations.

The key selecting unit 15 may select an inquiry key from among a plurality of keys included in a candidate question sentence on the basis of a history of answers to the presentation of a key for each key. As described above, the acquisition unit 11 acquires one of a positive answer, a negative answer, and a skip answer as an answer from a user for the presentation of a key in an inquiry. The acquisition unit 11 can total the numbers of answers for each type of answer to each key, for example, in a predetermined storage means (not illustrated in the drawing).

FIG. 8 is a diagram illustrating an example of the number of various types of answers for each candidate for an inquiry key extracted from a candidate question sentence. Here, in a case in which it is assumed that lowering of a priority level of a key for which the number of skip answers is large by regarding the key for which the number of skip answers is large to be a key that a user is difficult to answer is set in advance as a condition for selecting an inquiry key, the key selecting unit 15 selects the key "pictograph" for which the number of skip answers is the smallest as an inquiry key.

FIG. 9 is a diagram illustrating an example of the number of various answers for each inquiry key presented in a next inquiry after a certain inquiry key. Focusing on a relationship of keys continuously used in an inquiry, in a case in which it is assumed that raising of a priority level of a key for which a frequency of positive answers is high is set in advance as a condition for selecting an inquiry key, the key selecting unit 15 selects the key "cannot be sent" for which the number of positive answers is the largest as an inquiry key. Here, although the condition for selection is set only for the number of positive answers, for a plurality of types of answers, multiple conditions may be set.

According to the selection of such an inquiry key, for example, a higher priority level is configured to be set to a key for which the number of skip answers is smaller, a key for which the number of positive answers is larger, and the like, and accordingly, a key having a high possibility of contributing to narrow-down of candidate question sentences can be selected as an inquiry key.

Referring back to FIG. 1, the output unit 16 outputs one question sentence among candidate question sentences extracted by the candidate question sentence extracting unit 14. More specifically, in a case in which question sentences extracted by the candidate question sentence extracting unit 14 are specified as one sentence, the output unit 16 outputs the specified question sentence to the terminal 50 of the user.

In addition, the output unit 16 may output information relating to an answer associated with the specified question sentence. In this embodiment, since an answer ID is associated with each question sentence as information relating to an answer in the question sentence storing unit 20, the output unit 16 outputs an answer ID associated with the specified question sentence by referring to the question sentence storing unit 20 to the terminal 50. In accordance with this, an answer to a question from a user can be provided, and accordingly, the conversation system 1 can be configured as a so-called FAQ system.

Next, the functional units of the terminal 50 will be described. The input unit 51 accepts an input of information from a user and transmits the accepted information to the conversation device 10. In this embodiment, the input unit 51 accepts a free input sentence as a question sentence input by a user and transmits the accepted free input sentence to the conversation device 10.

In addition, the input unit 51 accepts answers (a positive answer, a negative answer, and a skip answer) input by the user for an inquiry including presentation of an inquiry key and transmits the accepted answer to the conversation device 10.

The output unit 52 acquires information from the conversation device 10 and outputs the acquired information to the user. In this embodiment, the output unit 52, for example, causes a display device to display the acquired information. More specifically, the output unit 52 outputs an inquiry including presentation of an inquiry key output by the inquiry unit 12 of the conversation device 10. In addition, the output unit 52 outputs a question sentence and information relating to an answer output by the output unit 16 of the conversation device 10.

Figure 10:
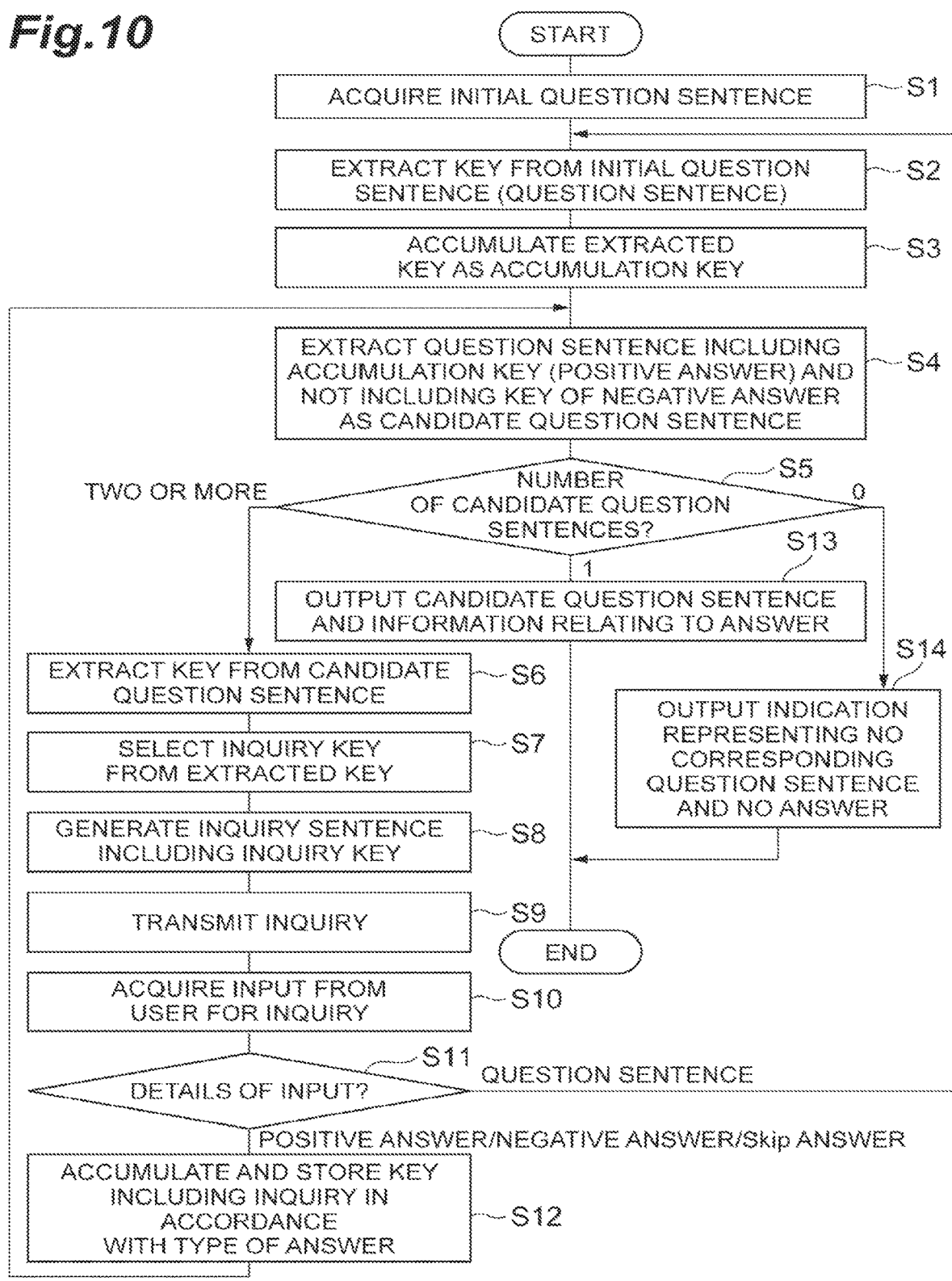
FIG. 10 is a flowchart illustrating process details of a conversation method according to this embodiment.

Next, a conversation method used in the conversation device 10 will be described with reference to FIG. 10. FIG. 10 is a flowchart illustrating process details of the conversation method according to this embodiment.

In Step S1, the acquisition unit 11 acquires an initial question sentence input as a free input sentence by a user. In Step S2, keys are extracted from the initial question sentence. In a case in which the process is performed in Step S2 after the process of Step S11, the acquisition unit 11 extracts keys from a question sentence configured by texts input by the user.

In Step S3, the key accumulating unit 13 accumulates the keys extracted in Step S2 as accumulation keys relating to a positive answer. In Step S4, the candidate question sentence extracting unit 14 extracts question sentences that include an accumulation key corresponding to an accumulated positive answer and do not include a key corresponding to a negative answer as candidate question sentences.

In Step S5, the conversation device 10 determines the number of the candidate question sentences extracted in Step S4. In a case in which the number of the candidate question sentences is equal to or larger than two, the process proceeds to Step S6. In a case in which the number of the candidate question sentences is one, the process proceeds to Step S13. In a case in which the number of candidate question sentences is zero, the process proceeds to Step S14.

In Step S6, the key selecting unit 15 extracts keys from the candidate question sentences. In Step S7, the key selecting unit 15 selects an inquiry key from among the keys extracted in Step S6 using one or more techniques among the various techniques described above.

In Step S8, the inquiry unit 12 generates an inquiry sentence including presentation of the inquiry key selected in Step S7. Subsequently, in Step S9, the inquiry unit 12 transmits the generated inquiry sentence to the terminal 50 of the user.

In Step S10, the acquisition unit 11 acquires an input from the user which includes an answer to the inquiry. In Step S11, the conversation device 10 determines details of the input (answer). In a case in which the details of the input are one answer among a positive answer, a negative answer, and a skip answer to the presentation of the inquiry key, the process proceeds to Step S12. In a case in which the details of the input, for example, are a question sentence input as a free input sentence, the process proceeds to Step S2.

In Step S12, the key accumulating unit 13 causes the accumulation key storing unit 30 to store the key caused to be included in the inquiry in association with each type of answer.

In a case in which the number of candidate question sentences is one in Step S5, the output unit 16 outputs the candidate question sentence specified as one and information relating to an answer associated with the candidate question sentence to the terminal 50 in Step S13.

In a case in which the number of candidate question sentences is zero in Step S5, the output unit 16 output information indicating that there is no question sentence corresponding to the details of the question from the user and that there is no answer to the terminal 50.

Figure 11:
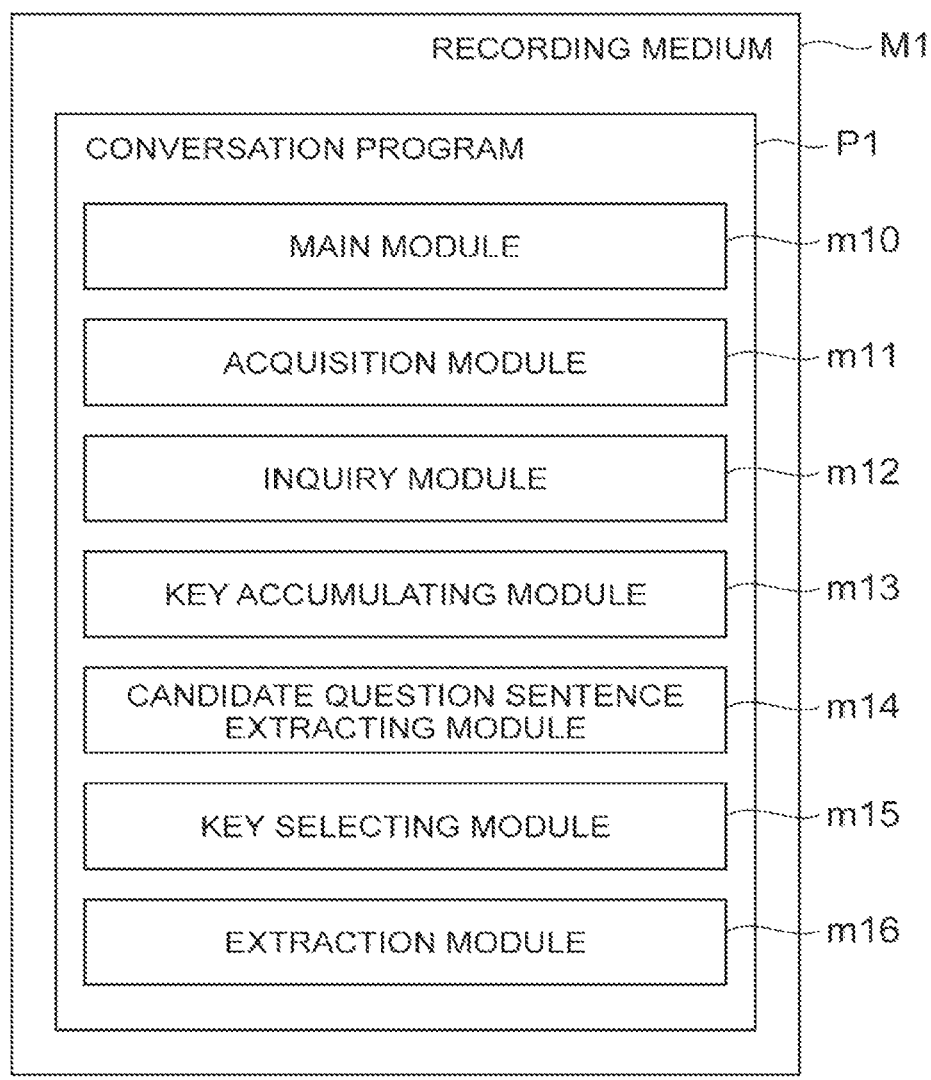
FIG. 11 is a diagram illustrating the configuration of a conversation program.

Next, a conversation program for causing a computer to function as the conversation device 10 according to this embodiment will be described. FIG. 11 is a diagram illustrating the configuration of a conversation program P1.

The conversation program P1 is configured to include a main module m10 that integrally controls a specifying process in the conversation device 10, an acquisition module m11, an inquiry module m12, a key accumulating module m13, a candidate question sentence extracting module m14, a key selecting module m15, and an output module m16. In accordance with the modules m11 to m16, functions for the acquisition unit 11, the inquiry unit 12, the key accumulating unit 13, the candidate question sentence extracting unit 14, the key selecting unit 15, and the output unit 16 of the conversation device 10 are realized. In addition, the conversation program P1 may be in the form of being transmitted through a transmission medium such as a communication line or, as illustrated in FIG. 11, may be in the form of being stored on a recording medium M1.

In the conversation device 10, the conversation method, and the conversation program P1 according to this embodiment described above, keys presented in an inquiry for which a positive answer has been acquired from the user are accumulated as accumulation keys, and candidate question sentences including accumulation keys are extracted. Accordingly, a question sentence having a high possibility of corresponding to a question sentence from the user is extracted as a candidate question sentence. Then, by selecting an inquiry key from among the keys included in the candidate question sentences, an inquiry presenting a key representing a candidate question sentence is performed, and accordingly, the number of candidate question sentences is reliably decreased in accordance with an answer to the inquiry. Therefore, the number of conversations for specifying a question sentence from the user can be decreased.

In a conversation system according to another embodiment, an output unit may output specified response details in a case in which the response details extracted by a candidate response details extracting unit is specified as one, and a key selecting unit may select an inquiry key for which the number of conversations formed by inquiries and answers performed until the response details are specified in accordance with a next inquiry and an answer to the inquiry is further decreased.

According to the embodiment described, in accordance with selection of an appropriate inquiry key, the number of conversations until response details are specified is reliably decreased.

In addition, in a conversation system according to another embodiment, an acquisition unit may acquire a free input sentence input by a user, and a key accumulating unit may extract keys from the free input sentence and accumulate the extracted keys as accumulation keys.

According to the embodiment described above, a free input sentence from a user is acquired, and keys extracted from the acquired free input sentence are accumulated. In accordance with this, in a case in which question details intended by a user are input as a free input sentence, a key relating to the question details can be acquired as an accumulation key.

In addition, in a conversation system according to another embodiment, in a case in which a response detail extracted by a candidate response details extracting unit is specified as one, an output unit may output the specified response detail and information relating to an answer associated with the response detail.

According to the embodiment described above, an answer to a question from a user can be provided, and accordingly, the conversation system can be configured as a so-called FAQ system.

In addition, in a conversation system according to another embodiment, an attribute may be associated with each key associated with response details stored in a response details storing unit, and a key selecting unit may select an inquiry key on the basis of a priority level of the attribute that has been set in advance.

According to the embodiment described above, for example, by setting a high priority level to a phrase with which attributes such as a noun, a technical term, and the like are associated, a noun, a technical terminal and the like included in candidate response details are selected as inquiry keys with priority. Therefore, a key that can be easily answered by the user and has a high possibility of appropriately narrowing down candidate response details can be set as an inquiry key.

In addition, in a conversation system according to another embodiment, a key selecting unit may select an inquiry key on the basis of a predetermined dependency relation with an accumulation key in candidate response details in which the accumulation key is included.

According to the embodiment described above, considering that a key having a predetermined dependency relation with an accumulation key in candidate response details has a high possibility of contributing to specifying the response details, by selecting a key having the predetermined dependency relation with an accumulation key as an inquiry key, an answer that is effective for narrowing down the candidate response details can be easily acquired.

In addition, in a conversation system according to another embodiment, each response detail stored in a response details storing unit has a priority level set in advance, and a key selecting unit may select a key included in candidate response details having the highest priority level among candidate response details as an inquiry key.

According to the embodiment described above, for example, by associating a priority level in advance with each response details on the basis of a frequency at which the response details are specified as response details from a user, other ranking information, and the like, a key included in candidate response details having a higher priority level can be selected as an inquiry key. In accordance with an inquiry including the inquiry key selected as above, the possibility of being able to specify response details from the user can be raised. As a result, the number of conversations for specifying response details from the user can be decreased.

In addition, in a conversation system according to another embodiment, a key selecting unit selects an inquiry key among a plurality of keys included in each of a plurality of candidate response details extracted by a candidate response details extracting unit, and the selected inquiry key may be a key for which the number of candidate response details extracted by the candidate response details extracting unit on the basis of an answer to a next inquiry is decreased by a predetermined proportion with respect to the plurality of extracted candidate response details in a case in which the selected inquiry key is caused to be included in the next inquiry.

According to the embodiment described above, for example, by setting the predetermined proportion relating to the number of candidate response details to about 50%, the number of candidate response details can be reliably decreased in accordance with each conversation. Therefore, it can be prevented that the number of conversations is extremely increased in accordance with a success/failure of selection of an appropriate inquiry key.

In addition, in a conversation system according to another embodiment, a key selecting unit selects an inquiry key among a plurality of keys included in a plurality of candidate response details extracted by a candidate response details extracting unit, and the selected inquiry key may be a key for which a value acquired by dividing a sum of frequency information associated with each candidate response details extracted by the candidate response details extracting unit on the basis of an answer to a next inquiry by the number of extracted candidate response details in a case in which the inquiry key is caused to be included in the next inquiry is the largest.

According to the embodiment described above, response details of which a frequency specified as response details according to the user is high can be specified through a smaller number of conversations.

In addition, in a conversation system according to another embodiment, an acquisition unit acquires one of a positive answer, a negative answer indicating negativity, and a skip answer as an answer from a user for the presentation of a key in an inquiry, and a key selecting unit may select an inquiry key on the basis of a history of answers to the presentation of a key for each key among a plurality of keys included in the candidate response details.

According to the embodiment described above, for example, by configuring a higher priority level to be set to a key for which the number of skip responses is less, a key for which the number of positive answers is more, and the like, a key having a high possibility of contributing to narrowing down can be selected as an inquiry key.

As above, while the embodiment has been described in detail, it is apparent to a person skilled in the art that the present invention is not limited to the embodiments described in this specification. The embodiment may be modified or changed without departing from the concept and the scope of the present invention set in accordance with the claims. Thus, the description presented in this specification is for the purpose of exemplary description and does not have any limited meaning for the embodiment.

Each aspect/embodiment described in the present specification may be applied to long term evolution (LTE), LTE-advanced (LTE-A), Super 3G, IMT-advanced, 4G, 5G, future ratio access (FRA), W-CDMA (Registered trademark), GSM (registered trademark), CDMA 2000, ultra mobile broadband (UMB), IEEE 802.11 (Wi-Fi), IEEE 802.16 (WiMAX), IEEE 802.20, ultra-wideband (UWB), Bluetooth (registered trademark), a system using another appropriate system and/or a next generation system extended based on these.

The processing sequence, the sequence, the flowchart, and the like of each aspect/embodiment described in the present specification may be changed in order as long as there is no contradiction. For example, in a method described in the present specification, elements of various steps are presented in an exemplary order, and the method is not limited to the presented specific order.

Information and the like may be output from an upper layer (or a lower layer) to a lower layer (or an upper layer). The information and the like may be input and output through a plurality of network nodes.

The input/output information and the like may be stored in a specific place (for example, a memory) or managed using a management table. The input/output information and the like may be overwritten, updated, or additionally written. The output information and the like may be deleted. The input information and the like may be transmitted to another device.

A determination may be performed using a value ("0" or "1") represented by one bit, may be performed using a Boolean value (true or false), or may be performed using a comparison between numerical values (for example, a comparison with a predetermined value).

The aspects/embodiments described in the present specification may be individually used, used in combination, or be switched therebetween in accordance with execution. In addition, a notification of predetermined information (for example, a notification of being X) is not limited to be performed explicitly and may be performed implicitly (for example, a notification of the predetermined information is not performed).

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such as infrared rays, radio waves, and microwaves, and the like, such wiring technologies and/or radio technologies are included in the definition of the transmission medium.

Information, a signal, and the like described in the present specification may be represented using any one among other various technologies. For example, data, a direction, a command, information, a signal, a bit, a symbol, a chip, and the like described over the entire description presented above may be represented using a voltage, a current, radiowaves, a magnetic field or magnetic particles, an optical field or photons, or an arbitrary combination thereof.

In addition, a term described in the present specification and/or a term that is necessary for understanding the present specification may be substituted with terms having the same meaning or a meaning similar thereto.

Terms "system" and "network" used in the present specification are compatibly used.

In addition, information, a parameter, and the like described in the present specification may be represented using absolute values, relative values from predetermined values, or other corresponding information.

Description of "on the basis of" used in the present invention does not mean "only on the basis of" unless otherwise mentioned. In other words, description of "on the basis of" means both "only on the basis of" and "at least on the basis of."

In the present specification, in a case in which names such as "first," "second," and the like are used, referring to each element does not generally limit the amount or the order of such an element. Such names may be used in the present specification as a convenient way for distinguishing two or more elements from each other. Accordingly, referring to the first and second elements does not mean that only the two elements are employed therein or the first element has to precede the second element in a certain form.

As long as "include," "including," and modifications thereof are used in the present specification or the claims, such terms are intended to be inclusive like a term "comprising." In addition, a term "or" used in the present specification or the claims is intended to be not an exclusive logical sum.

In the present specification, other than a case in which clearly only one device is present in a context or technically, a device includes a plurality of devices.

In the entirety of the present disclosure, unless a singular form is represented clearly from the context, plural forms are included.

REFERENCE SIGNS LIST

1 Conversation system
10 Conversation device
11 Acquisition unit
12 Inquiry unit
13 Key accumulating unit
14 Candidate question sentence extracting unit
15 Key selecting unit
16 Output unit
20 Question sentence storing unit
30 Accumulation key storing unit
50 Terminal
51 Input unit
52 Output unit
M1 Recording medium
m10 Main module
m11 Acquisition module
m12 Module
m13 Key accumulating module
m14 Candidate question sentence extracting module
m15 Key selecting module
m16 Output module
N Network
P1 Conversation program

The invention claimed is:

1. A conversation system configured to specify a response detail specified by a set of one or more keys formed from phrases on the basis of an initial input from a user, the conversation system comprising circuitry configured to:
acquire the initial input, that seeks an answer to a target question, from the user as part of a conversation that is automatically conducted with the user without human intervention;
as part of the conversation, perform
(i) extract further details regarding the target question by outputting an inquiry including presentation of a key, which is a word representing a specific topic, to the user in response to the initial input, wherein the inquiry is in a form of a question requesting positive or negative affirmation from the user on whether the presented key is related to the specific topic the user is interested in;
(ii) acquire an input from the user which includes an answer to the inquiry;
(iii) acquire keys included in the inquiry, and any other inquiries presented to the user, and accumulate the acquired keys as accumulation keys in a case in which a positive answer indicating positivity for the inquiry is acquired from the user;
(iv) refer to a storage configured to store response details and a set of keys included in the response details in association with each other, the response details being predetermined question sentences that are candidate target questions from the user to the conversation system, and
(v) when there are a plurality of response details in the storage that include the accumulation keys, extract the response details including the accumulation keys accumulated by the circuitry as candidate response details;

select an inquiry key that is a key caused to be included in a next inquiry output by the circuitry among a plurality of keys included in the candidate response details on the basis of a predetermined technique; and repeat steps (i)-(iv) until there is only one response detail in the storage that includes the accumulation keys, and (vi) when there is only one response detail in the storage that includes the accumulation keys following step (iv), output the one response detail along with information relating to an answer to the predetermined question sentence of the outputted one response detail, wherein the predetermined technique includes the circuitry selecting the inquiry key for which the number of conversations formed by inquiries and answers which are preformed until the response detail is specified in accordance with the next inquiry and an answer to the inquiry becomes less.

2. The conversation system according to claim 1,
wherein an attribute is associated with each of the keys associated with the response details stored in the storage, and
wherein the circuitry selects the inquiry key on the basis of a priority level of the attribute set in advance.

3. The conversation system according to claim 1, wherein the circuitry selects the inquiry key on the basis of a predetermined dependency relation of the candidate response detail in which the accumulation key is included with the accumulation key.

4. The conversation system according to claim 1,
wherein each of the response details stored in the storage has a priority level set in advance, and
wherein the circuitry selects a key included in a candidate response detail, which has a highest priority level among the candidate response details, as the inquiry key.

5. The conversation system according to claim 1,
wherein the circuitry selects the inquiry key among a plurality of keys included in each of a plurality of candidate response details extracted by the circuitry, and
wherein the selected inquiry key is a key for which the number of candidate response details extracted by the circuitry on the basis of an answer to a next inquiry decreases by a predetermined proportion, with respect to the number of the plurality of candidate response details that have already been extracted, in a case in which the key is caused to be included in the next inquiry.

6. The conversation system according to claim 1,
wherein the circuitry selects the inquiry key from among a plurality of keys included in each of a plurality of candidate response details extracted by the circuitry, and
wherein the selected inquiry key is a key for which a value, acquired by dividing (i) a sum of a total number of times each of the candidate response details extracted by the circuitry resulted to be specified as an initial inquiry on the basis of an answer to a next inquiry by (ii) the number of the different extracted candidate response details, is the largest in a case in which the key is caused to be included in the next inquiry, wherein the initial inquiry is output from the conversation system in response to the initial input from the user and any next inquiry is a subsequent inquiry output from the conversation system.

7. The conversation system according to claim 1,
wherein the circuitry acquires one of the positive answer, a negative answer indicating negativity, and a skip answer as an answer from the user for the presentation of the key in the inquiry, and
wherein the circuitry selects the inquiry key on the basis of a history of answers to the presentation of each of a plurality of keys included in the candidate response detail.

8. A method implemented by circuitry of a conversation system configured to specify a response detail specified by a set of one or more keys formed from phrases on the basis of an initial input from a user, the method comprising:

acquiring the initial input, that seeks an answer to a target question, from the user as part of a conversation that is automatically conducted with the user without human intervention;

as part of the conversation, perform (i) extracting further details regarding the target question by outputting an inquiry including presentation of a key, which is a word representing a specific topic, to the user in response to the initial input, wherein the inquiry is in a form of a question requesting positive or negative affirmation from the user on whether the presented key is related to the specific topic the user is interested in;

(ii) acquiring an input from the user which includes an answer to the inquiry;

(iii) acquiring keys included in the inquiry, and any other inquiries presented to the user, and accumulate the acquired keys as accumulation keys in a case in which a positive answer indicating positivity for the inquiry is acquired from the user;

(iv) referring to a storage configured to store response details and a set of keys included in the response details in association with each other, the response details being predetermined question sentences that are candidate target questions from the user to the conversation system, and (v) when there are a plurality of response details in the storage that include the accumulation keys,
extracting the response details including the accumulation keys accumulated by the circuitry as candidate response details;
selecting an inquiry key that is a key caused to be included in a next inquiry output by the circuitry among a plurality of keys included in the candidate response details on the basis of a predetermined technique; and
repeating steps (i)-(iv) until there is only one response detail in the storage that includes the accumulation keys, and (vi) when there is only one response detail in the storage that includes the accumulation keys following step (iv), outputting the one response detail along with information relating to an answer to the predetermined question sentence of the outputted one response detail, wherein the predetermined technique includes the circuitry selecting the inquiry key for which the number of conversations formed by inquiries and answers which are preformed until the response detail is specified in accordance with the next inquiry and an answer to the inquiry becomes less.

* * * * *